United States Patent
Moriwaki et al.

(10) Patent No.: US 6,611,527 B1
(45) Date of Patent: Aug. 26, 2003

(54) PACKET SWITCHING APPARATUS WITH A COMMON BUFFER

(75) Inventors: Norihiko Moriwaki, Kokubunji (JP); Mitsuhiro Wada, Yokohama (JP); Takahiko Kozaki, Tokyo (JP); Hiroaki Kasahara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/497,210

(22) Filed: Feb. 3, 2000

(30) Foreign Application Priority Data

Jun. 9, 1999 (JP) ............................................. 11-162039

(51) Int. Cl.$^7$ ............................................. H04L 12/28
(52) U.S. Cl. ......................... 370/412; 370/413; 370/428
(58) Field of Search ................................. 370/412–416, 370/419, 420, 415, 418, 417, 421, 423, 424, 428, 429, 395, 398; 704/211; 712/4; 711/141; 365/189.05

(56) References Cited

U.S. PATENT DOCUMENTS

| | | | |
|---|---|---|---|
| 3,816,664 A * | 6/1974 | Koch | 704/211 |
| 4,910,731 A | 3/1990 | Sakurai et al. | 370/413 |
| 5,019,969 A * | 5/1991 | Izumisawa et al. | 712/4 |
| 5,099,475 A | 3/1992 | Kozaki et al. | 370/422 |
| 5,146,427 A * | 9/1992 | Sasaki et al. | 365/189.05 |
| 5,987,571 A * | 11/1999 | Shibata et al. | 711/141 |
| 6,185,212 B1 * | 2/2001 | Sakamoto et al. | 370/412 |
| 6,249,524 B1 * | 6/2001 | Moriwaki et al. | 370/412 |
| 6,463,066 B2 * | 10/2002 | Moriwaki et al. | 370/412 |
| 6,507,584 B1 * | 1/2003 | Moriwaki et al. | 370/398 |

* cited by examiner

*Primary Examiner*—Salvatore Cangialosi
(74) *Attorney, Agent, or Firm*—Antonelli, Terry, Stout & Kraus, LLP

(57) ABSTRACT

A plurality of address chains are assigned to each of such flows as output lines, priority control, etc. in the address management carried out in a switch with a shared buffer. Each of the address chains has a write address register 20 and a read address register 30. The switch is also provided with a distributive pointer 22 for distributing cells in a flow to a plurality of address chains and a write address register selector 21, as well as a read pointer 32 for reading packets from a plurality of the address chains and a read address register selector 31 so as to read the packets through a pipeline with use of those plural address chains.

9 Claims, 13 Drawing Sheets

PACKET SWITCHING APPARATUS WITH A COMMON BUFFER

BACKGROUND OF THE INVENTION

The present invention relates to a packet switching apparatus which is used in the asynchronous transfer mode (to be referred to as ATM hereafter) and a packet switching apparatus for forwarding IP (internet protocol) packets.

FIG. 14 is a block diagram of an ATM switching apparatus for switching fixed length packets (referred to as cells for ATM). The ATM switching apparatus includes ingress cards 85, a switch 86, egress cards 87, and a controller 88. An ingress card 85 contains a line terminator 851 for terminating a physical layer signal received from a transmission line 850, a UPC (Usage Parameter Control)/OAM (Operation Administration and Maintenance) unit 852 used for flow monitoring and performance monitoring, a header converter 853 for changing the label of each received cell and for giving the cell a routing header for switching. An egress card 87 is provided with an OAM unit 871, a line output unit for terminating the ATM layer and for processing a physical layer signal to output the signal to a transmission line 870. The egress card 87 may have the function to distribute signals to lower the line speed. The egress card 87 may also be provided with a shaping buffer for priority control in some cases.

Different types of ATM switch are described in "Broadband ISDN and ATM Techniques" (page 101) issued in February, 1995, by The Institute of Electronics, Information and Communication Engineers. The ATM switches proposed so far have their own characteristics according to the placement of cell buffer memories. A shared buffer type ATM switch, disclosed in U.S. Pat. No. 4,910,731 or "Shared Buffer Type Memory Switch for ATM Switching Network", introduced in the Transactions of IEICE BI (J72-B-1, No. 11, pp. 1062–1069, November, 1989), has a centralized buffer memory shared among all the output ports of the switch. The shared buffer type switch has been widely used because buffer sharing can reduce the amount of hardware; in other words, buffer memory utilization is highly improved compared with that of a separated buffer type memory switch.

FIG. 2 is a block diagram of a conventional ATM switch with a shared buffer. The operation of this switch will be explained as follows. Cells from all the input lines 10 (10-1 to 10-n) enter the multiplexer (MUX) 2. A route decoder 4 then selects a write address register (WA)6 (any of 6-1 to 6-n) by decoding the cell header obtained from MUX2, which indicates the destination output. The write address of a cell buffer memory 1 is obtained from a WA (any of 6-1 to 6-n) and multiplexed cells are written one by one into the cell area 1-1 in the buffer memory 1. At the same time, an idle address provided from an idle address buffer (IABF) 8 is written in the address pointer area 1-2 of the same address as the cell is written in, and it also is written in the, selected write address register (WA) 6 (any of 6-1 to 6-n) overwriting the former WA6 (any of 6-1 to 6-n) content. This address indicates the writing address of the next cell, which will be input into the output queue corresponding to the same WA6 (any of 6-1 to 6-n). When a cell is output from the switch, the reading address of the buffer memory 1 is determined by the read address register (RA) 7 (any of 7-1 to 7-n) each corresponding to the output line. An output counter 9 and an output decoder 5 specify one of the address registers (RA) 7 (any of 7-1 to 7-n) cyclically. The output cells from the buffer memory 1 are demultiplexed through a demultiplexer (DMX) 3 to the target output line 11 (any of 11-1 to 11-n). When the cell is read, the address pointer in the same address overwrites the read address register (RA) 7 (any of 7-1 to 7-n) which had indicated the reading address. The address previously contained in RA (same as the address from which the cell is read) is stored in IABF8, because this address. becomes idle and is replaced by the next address.

FIG. 3 shows the structure of an address chain corresponding to an output line, constructed by the address pointers. An address chain 20-1 corresponding to an output line 11-1 is formed between a start address stored in the read address register (RA1) 7-1 and an end address stored in the write address register (WA1) 6-1. Another address chain 20-2 corresponding to an output line 11-2 is formed between a start address stored in the read address register (RA2) 7-2 and an end address stored in the write address register (WA2) 6-2.

The operation described above shows a simple example of how to realize address chains corresponding to output lines. Each chain logically acts as a queue buffer for each output on the same memory. The above mentioned switch is easily modified to provide a priority control function by assigning a plurality of queues corresponding to multiple service classes and output lines, respectively, as disclosed in U.S. Pat. No. 4,910,731.

Furthermore, the official gazette of Japanese Patent Application No. 3-10441 has disclosed a shared buffer switch, in which, m demultiplexers are connected to input lines and m multiplexers are connected to output lines of the switch having an I/O line speed of V and a switching capacity of n×n, resulting in a switch having I/O lines speeded up to mV and a switching capacity of (n/m)×(n/m).

FIG. 4 shows a shared buffer switch with fast I/O lines, the speed of which is doubled using the method mentioned above A fast input line 12-1 is demultiplexed by a demultiplexer 13-1 to input lines 10-1 and 10-2. Both of the lines 10-1 and 10-2 are connected to a MUX 2, respectively. Each cell multiplexed by MUX 2 is stored in the shared buffer 1 by forming an address chain corresponding to each of the output lines 15-1 and 15-2. Two cells belonging to the same address chain are sequentially read from the cell buffer 1. Then, for example, the two cells bound for the same output line 15-1 are demultiplexed to lines 11-1 and 11-2, and next multiplexed to the designated output line 15-1 by a multiplexer 14-1.

The above mentioned shared buffer switches have been mainly targeted for an ATM node which switches fixed length packets called cells. To realize a large-scale IP router, the same switching architecture with fixed length packets is effective. In this regard, a variable length IP packet is chopped up into fixed length packets and they are switched by hardware at the switch core, and then segmented portions are reconstructed into the original IP packet For example, "The Tirfy Tera: A Packet Switch Core" (Hot Interconnects V, Stanford University, August 1996) has proposed a crossbar switch with input buffers. This switch architecture requires scheduling of packet transfer between input ports and output ports. In this configuration, each input buffer is divided into plural queue buffers corresponding to each output port so that packets can be read from any queue buffer indicated by the scheduler, thereby reducing the throughput degradation by HOL (Head Of Line Blocking).

SUMMARY OF THE INVENTION

In the above conventional shared buffer switch, an address chain is formed for each corresponding output line. In other words, one logical queue per output port is constructed on the shared buffer memory. In this structure, the interval of updating each address chain limits the attainable line speed.

Under such the circumstances, therefore, the main object of the present invention is to provide a shared buffer switch with a fast input and output line rate.

According to the present invention, a plurality of address chains are assigned to each flow. (A flow is defined as different kinds of level, such as output port, priority class and so on). A plurality of logical queues formed by plural address chains are pipelined. Concretely, the switch of the present invention is equipped with a distributive pointer for distributing each cell flow to a plurality of address chains cyclically and a read pointer to select one of the address chains cyclically. These pointers are provided for each flow and have a task to select a chain each time in a manner to preserve the sequential order of cell flow. Consequently, with this architecture, it is possible to access another address chain of the same flow sequentially before updating one chain. As a result, the time interval of cells in each flow output from the shared buffer switch can be shortened.

Furthermore, the distributive pointer and the read pointer can be activated on demand, thereby enabling selection of fast or slow input/output lines or coexistence of fast and slow lines in the same switch.

DESCRIPTION OF THE PREFERRED EMBODIMENTS

<First Embodiment>

Figure 2:
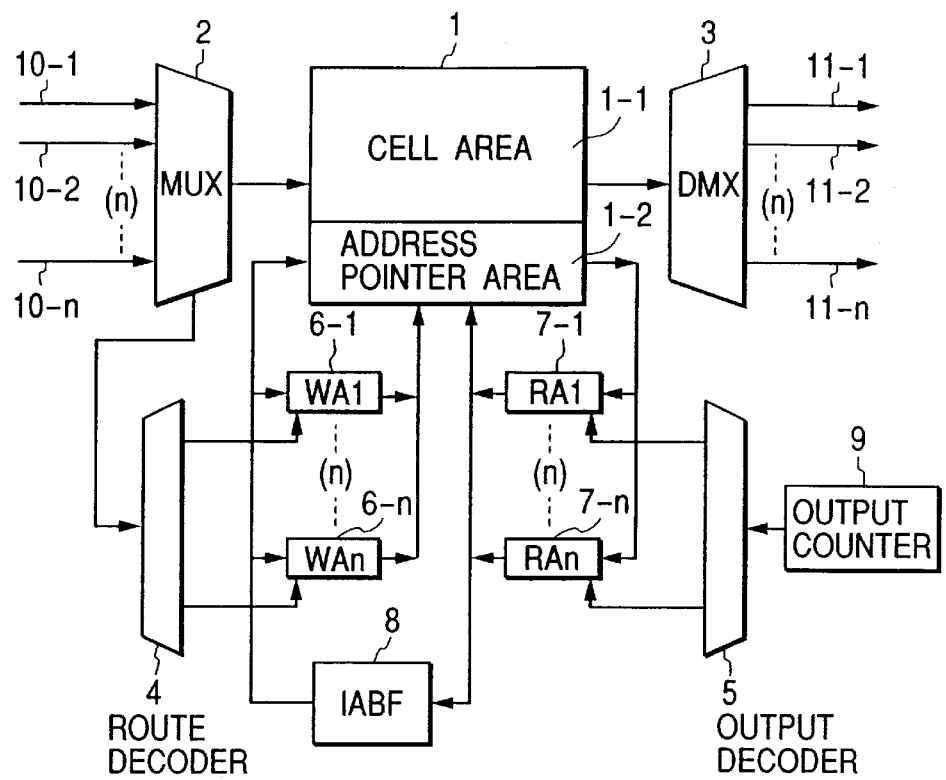
FIG. 2 is a block diagram of a conventional shared buffer switch.
Figure 3:
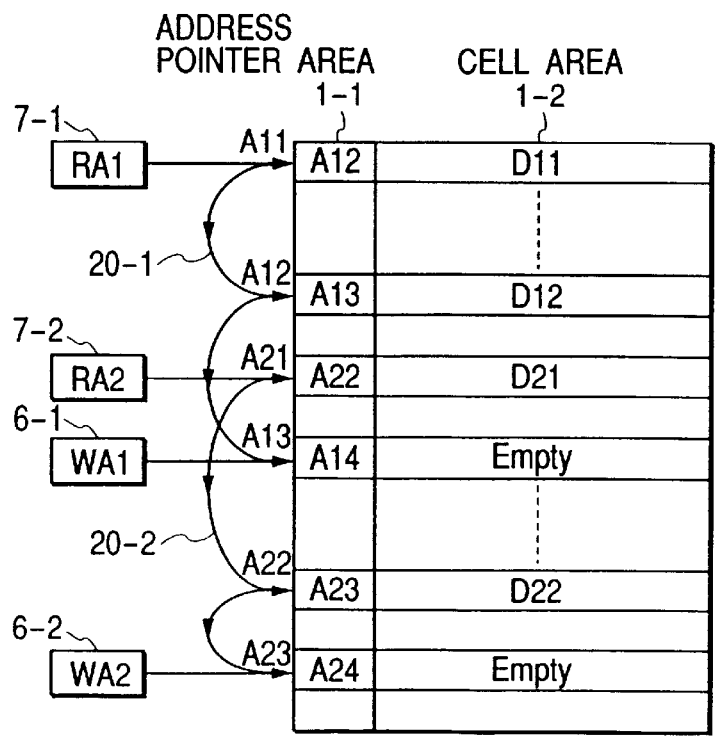
FIG. 3 is a diagram of the address chain structure of the conventional shared buffer switch.
Figure 4:
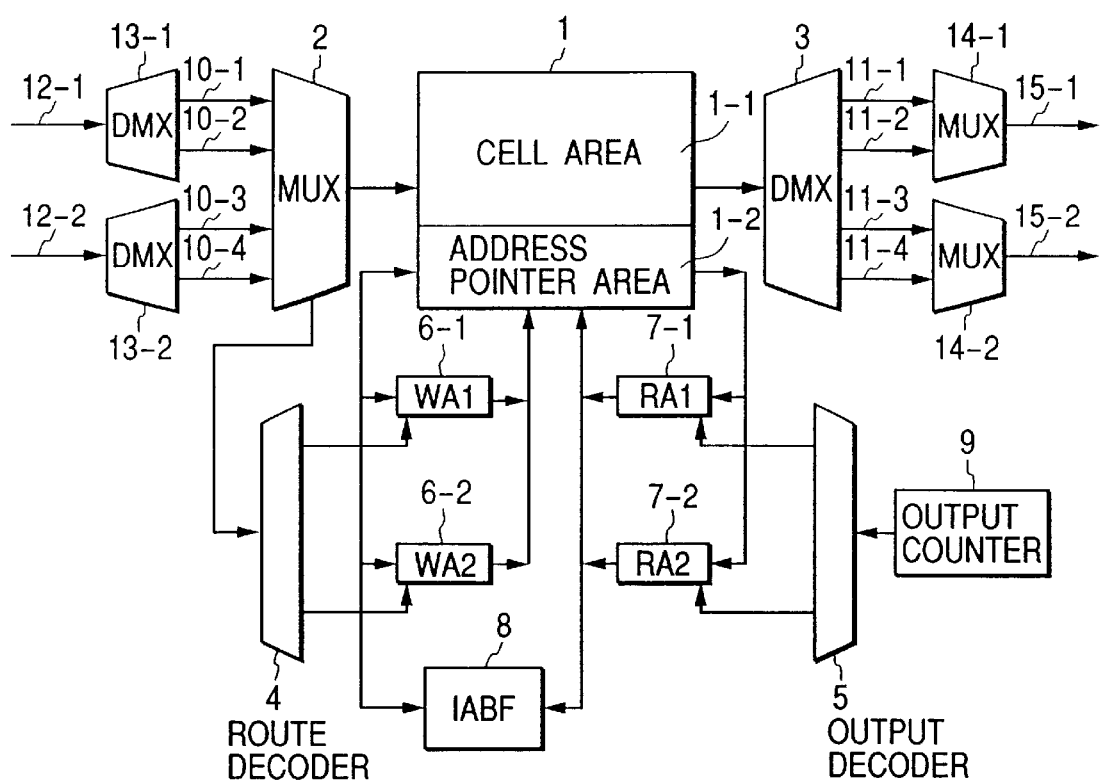
FIG. 4 is a block diagram of another conventional shared buffer switch.

Hereunder, the first embodiment of the present invention will be described. In the first embodiment, only those items which are different from the configuration of the conventional shared buffer switch shown in FIG. 2 will be described in detail, thereby avoiding redundant description.

Figure 1:
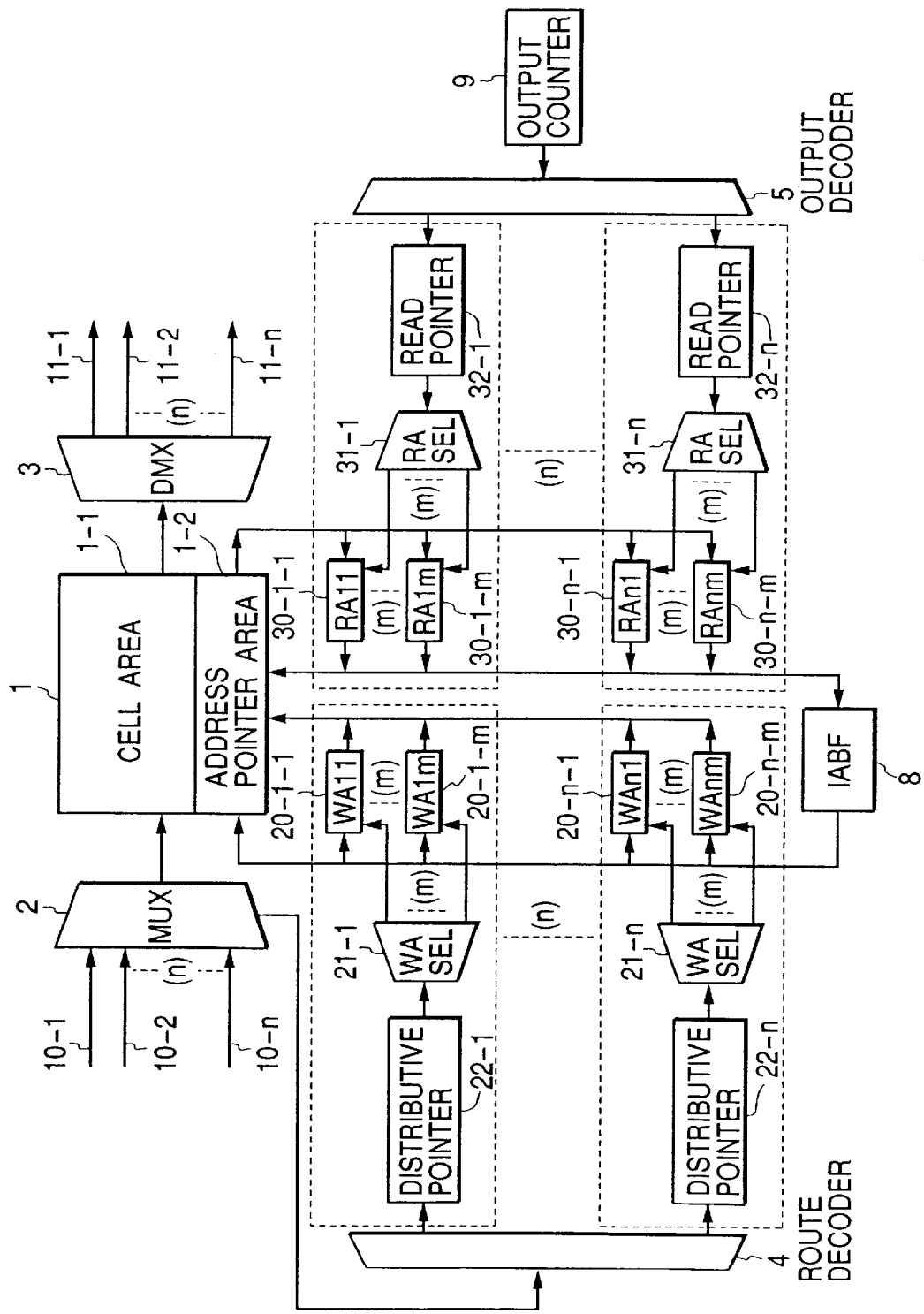
FIG. 1 is a block diagram of a shared buffer switch according to the present invention.

FIG. 1 shows a shared buffer switch of n×n switching capacity, which can accommodate fast lines. The shared buffer switch is provided with a buffer memory 1; a multiplexer (MUX) 2; a demultiplexer (DMX) 3; a route decoder 4; an output decoder 5; an idle address buffer (IABF) 8; an output counter 9; input lines 10 (10-1 to 10-n); output lines 11 (11-1 to 11-n); write address registers (WA) 20; WA selectors 21; distributive pointers 22; read address registers (RA) 30; RA selectors 31; and read pointers 32. The buffer memory 1 is divided into a cell area 1-1 and an address pointer area 1-2. The operation of this switch will be explained below.

Cells entered from all the input lines 10 (10-1 to 10-n) are multiplexed at the multiplexer (MUX) 2. The route decoder 4 decodes the cell header of each cell and identifies the object output line. A WA selector 21 corresponding to the decoded output line selects one of m write address registers (20-x-1 to 20-x-m (x: any of 1 to n)) cyclically according to the distributive pointer 22-1. For example, one of the write address registers from WA11 (20-1-1) to WA1m (20-1-m) is selected cyclically by the distributive pointer 22-1 each time a cell bound for the output line 11-1 arrives. The address stored in the selected write address register 20 is then sent to the buffer memory 1 to specify the writing address cells output from the multiplexer 2 are written one by one in the cell area 1-1 in the buffer memory 1 according to the writing address. At the same time, an idle address provided from IABF 8 is written in both of the address pointer area 1-2 of the same address as the cell is written in, and the selected write address register (WA) 20 (any of 20-1-1 to 20-n-m) overwriting the former content. With such a configuration as explained above, cells having the same destination output line are written in each of the m address chains cyclically.

Next, a description will be provided to show how cells are read from the above switch. When a cell is read from the buffer memory 1, the reading address is specified by selecting one of the m read address registers (RA) 30 (30-x-1 to 30-x-m (x: any of 1 to n)) provided for each line (1 to n) specified by the output counter 9. In this embodiment, the output counter is assumed to be a modulo-n counter. In this case, the PA selector 31 selects one of the m read address registers 30 for each line. The selection is performed by the read pointer 32 so as not to disturb the sequential order of cell flow, that is, so as to select one of the read address registers 30 cyclically in the same order as the corresponding write address registers 20 were selected. Cells output from the cell area 1-1 are demultiplexed through the demultiplexer (DMX) 3 to the targeted output line 11 (11-1 to 11-n) When a cell is read from the cell buffer 1, the address pointer stored in the same address overwrites the read address register (RA) 30 (any of 30-1-1 to 30-n-m) which had indicated the address. After the cell is read, the address of the cell in the buffer memory is stored in IABF 8 because this address becomes idle.

Figure 5:
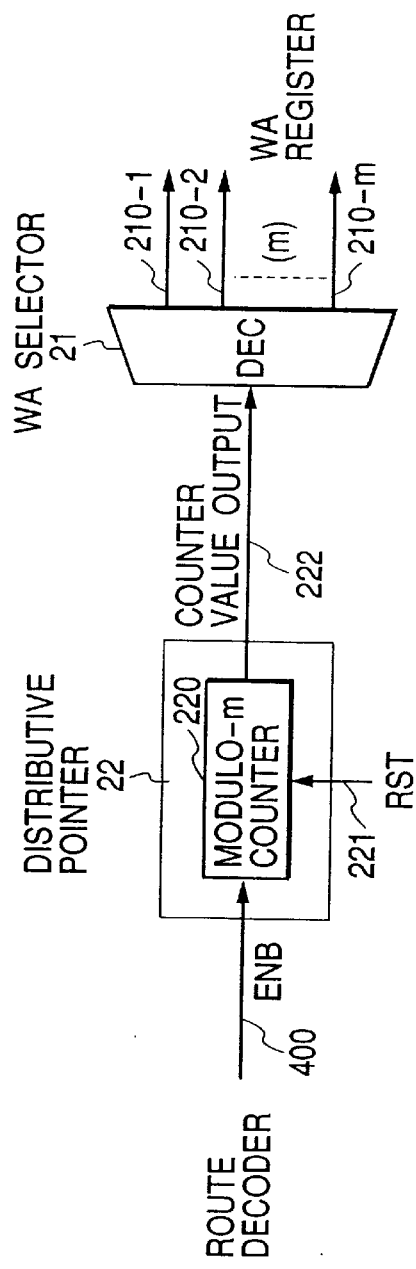
FIG. 5 is a block diagram of a distributor of the shared buffer switch according to the present invention.

FIG. 5 shows details of a distribution processing when cells are written in the above switch. A distributive pointer 22 has a modulo-m counter 220. When a cell arrives at the switch, the route decoder 4 asserts an enable signal (enb) 400 to one of the distributive pointers 22 according to the result of the decoding, thereby the MODULO-m counter 220 counts up. The WA selector 21 then decodes the counter value 222 and selects one of the m selectors WA 20. With such a configuration, one of the m selectors WA 20 is selected cyclically each time when a cell for a corresponding output line arrives.

Figure 6:
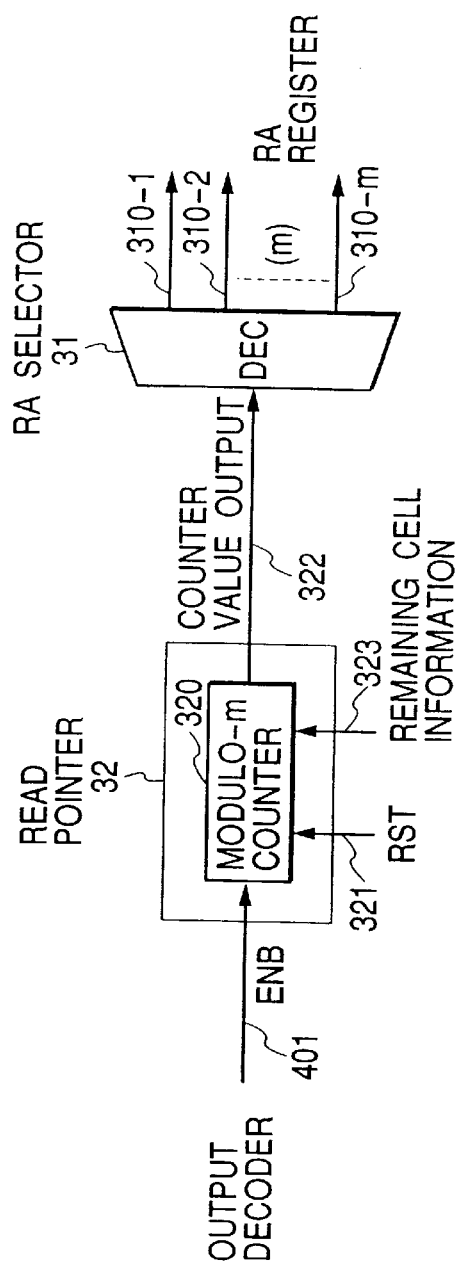
FIG. 6 is a block diagram of a reader of the shared buffer switch according to the present invention.

FIG. 6 shows details of a cell reading processing. Each read pointer 32 has a modulo-m counter 320. The enable signal (enb) 401 is asserted to the modulo-m counter 320 at the output timing, being notified by the output decoder 5. The modulo-m counter 320 counts up by detecting the enable signal (enb) 401, only when there are any cells to read for a corresponding output line. The remaining cell information 323 is used to indicate whether or not there is a cell to be read for the corresponding line. If there is no cell to be read, the modulo-m counter 320 does not count up. The remaining cell information 323 is calculated based on the number of input cells and output cells for each output line. The remaining cell information 323 can also be determined by judging whether the content of WA20 equals that of RA30 of the same address chain. The RA selector 31 decodes the counter value 322 from the read pointer 32, thereby selecting one of the m RA selectors 20. With such a configuration, one of the m WA selectors 20 is selected cyclically at a periodical output timing. In addition, both distributive pointer 22 and read pointer 32 receive reset signals 221 and 321 when the switch is initialized, thereby resetting their counter values to zero, respectively.

Figure 7:
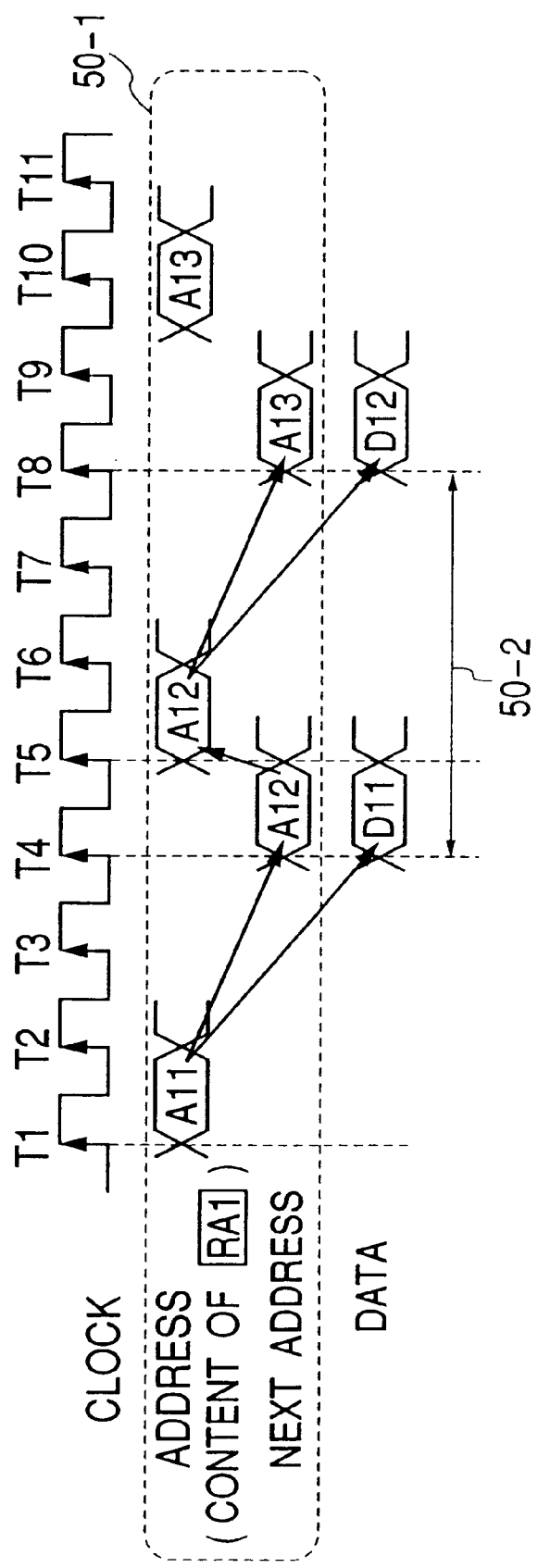
FIG. 7 is a timing chart of the outputting of cells from the conventional shared buffer switch.

Next, a description will be provided to show the effect of shortening the time interval of cell outputs using timing charts. FIG. 7 shows an example of a conventional address chain in which one address chain 50-1 is assigned to each output line, as is the case of the conventional shared buffer switch shown in FIG. 2. In this example, it is assumed that three timings are required until the read address register is updated, that is, giving the address to the buffer memory 1, then cell data and an address pointer are output, and finally the address register is overwritten by the address pointer. For example, in the case of the address chain corresponding to an output line 11-1 shown in FIG. 2, both cell data D11 and address pointer A12 are output from the buffer memory 1 at T4 in response to the address A11 given at T1 from the read address register (RA1) 7-1. The content of the read address register (RA1) 7-1 is updated to the address A12 at T5, and then the address A12 is given to the buffer memory 1 at T5. The next cell data D12 and the next address pointer A13 are output at T8. In the example described above, cells are output in cycles of 4 timings (50-2).

Figure 8:
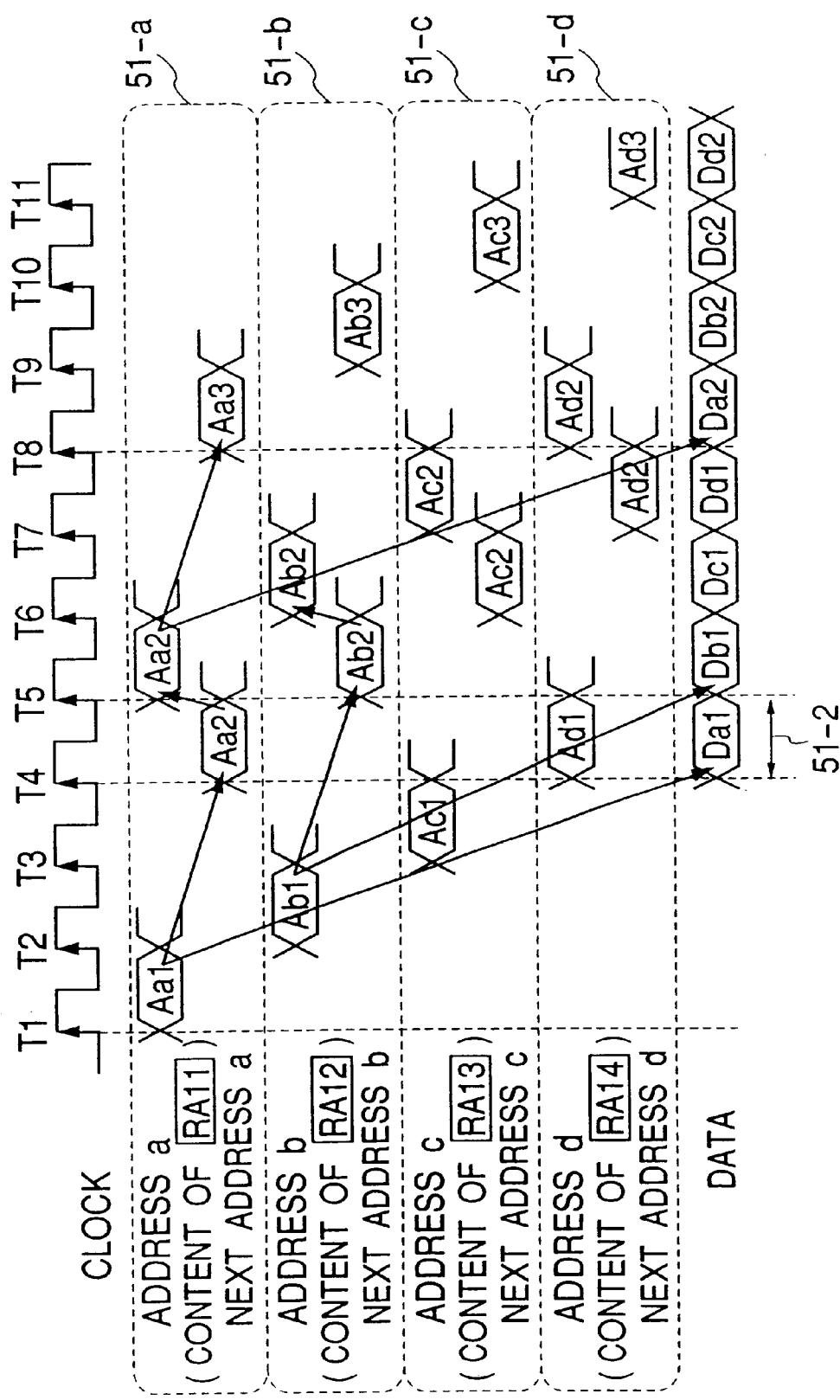
FIG. 8 is a timing chart of the outputting of cells from the shared buffer switch according to the present invention.

FIG. 8 is a timing chart of the switch when a plurality of address chains (4 chains in this embodiment) 51-a to 51-d are assigned to each output line and those address chains are pipelined. For example, the set of address chains corresponding to an output line 11-1 shown in FIG. 1 is considered. The cell data Da1 and the address pointer Aa2 are output at T4 in response to the address Aa1 given at T1 from the react address register (RA11) 30-11 (51-a) The cell data Db1 and the address pointer Ab2 are output at T5 in response to the address Ab1 given at a time T2 from the read address register (RA12) 30-1-2(51-b).

Because the address of another address chain can be given to the buffer memory 1 consecutively before the updating of one address chain, cell data can be output in cycle of 1 timing (51-2).

Figure 15:
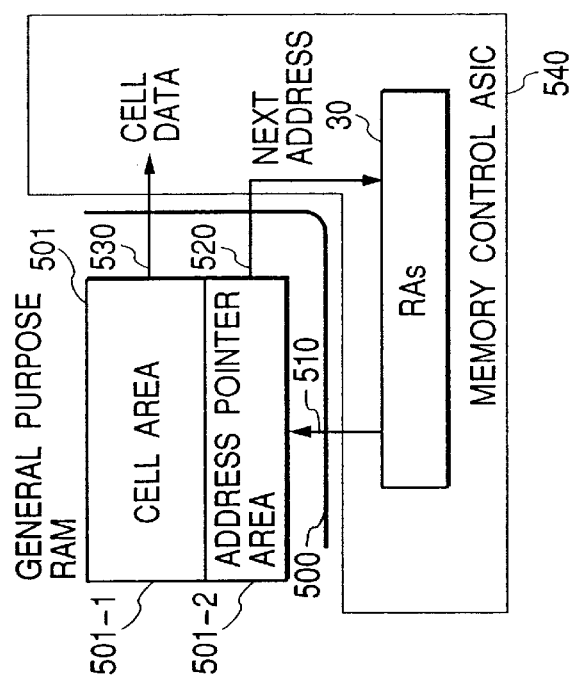
FIG. 15 is a block diagram of a memory interface of the shared buffer switch according to the present invention.

FIG. 15 shows an example in which the proposed shared buffer switch is composed of a general purpose RAM 501 used as the buffer memory 1 and the memory control ASIC 540. The general purpose RAM 501 may actually employ general purpose SRAMS, DRAMs, etc. The general purpose RAM 501 is divided into a cell area 501-1 and an address pointer area 501-2.

Figure 16:
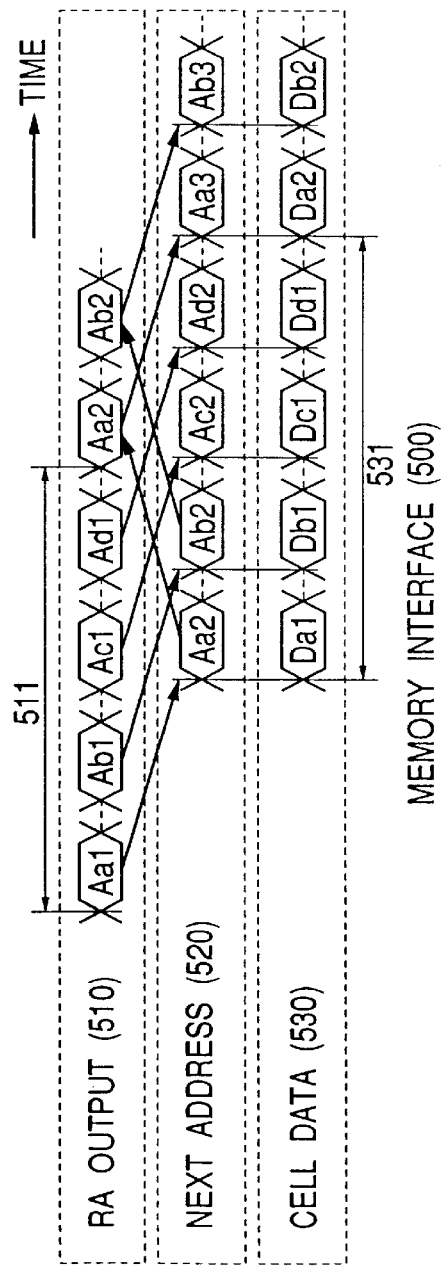
FIG. 16 is a timing chart of cell output at a memory interface of the shared buffer switch according to the present invention.

FIG. 16 is a timing chart similar to that shown in FIG. 8. It shows the output timings of an RA output 510, the next address 520, and cell data 530 at the RAM interface. The designation RA denotes a Read Address Register in the memory control ASIC 540.

Hereunder, a description will be provided to show how cells bound for the same output line are stored sequentially in a plurality of address chains according to the distributive pointer 22, and then how those stored cells are selected and output according to the read pointer 32.

Figure 9:
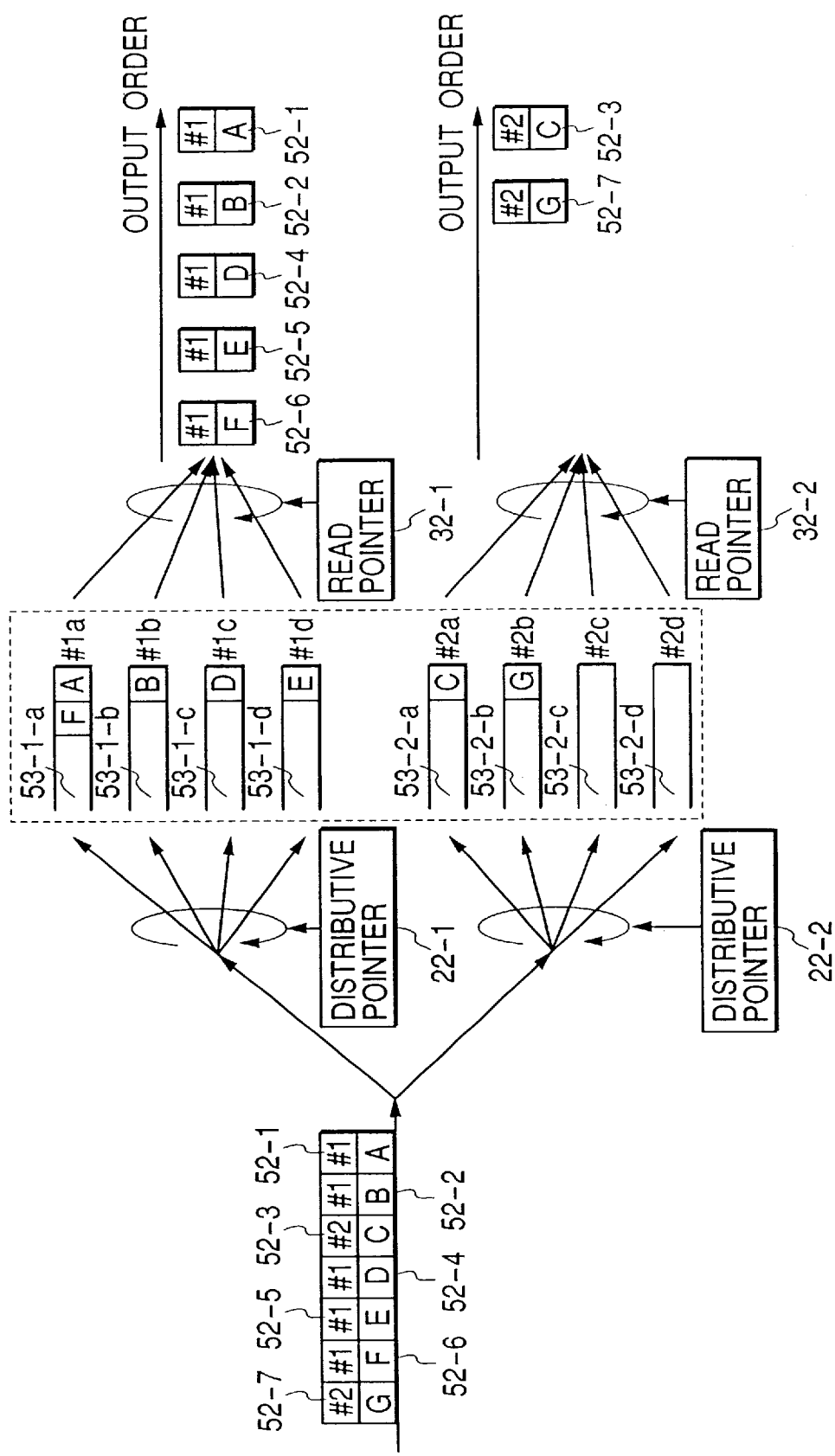
FIG. 9 is a diagram for describing an example of address management in the shared buffer switch according to the present invention.

FIG. 9 shows a logical configuration of the switch in which four address chains are pipelined for each output line. In this example, two output lines are considered so as to simplify the description. First, each of the cells A to G (52-1 to 52-7) output from the MUX 2 is sorted to an address chain group 53-1 or 53-2 corresponding to the output line according to the destination information (#1 or #2) in the cell header. Then, the cells sorted to the output line #1 are distributed to one of a plurality of address chains cyclically according to the distributive pointer 22-1. In FIG. 9, the cells A(52-1), B(52-2), D(52-4), E(52-5), and F(52-6) are distributed cyclically to the four address chains 53-1-a to 53-1-d. When reading those cells from the address chain group 53-1, the selection of an address chain is indicated by the read pointer 32-1, so as to maintain cell sequence integrity. In the same way, the cells sorted to the output line #2 are distributed cyclically to one of a plurality of address chains according to the distributive pointer 22-2. In FIG. 9, the cells C(52-3) and G(52-7) are distributed cyclically to one of the four address chains 53-2-a to 53-2-d. When reading those cells from the address chain group 53-2, the selection of an address chain is indicated by the read pointer 32-2, so as to maintain the cell sequence integrity.

Figure 10:
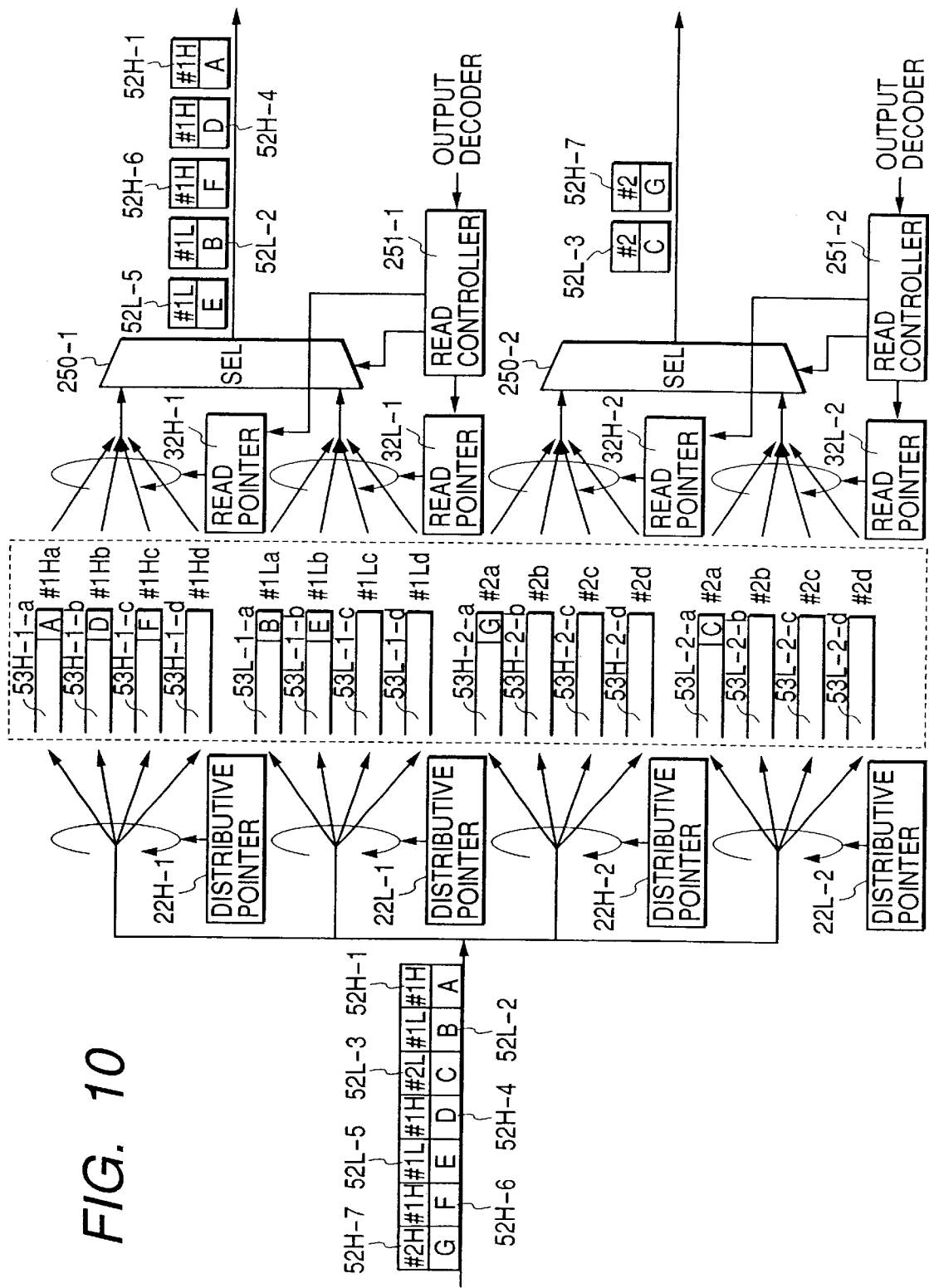
FIG. 10 is a diagram for describing another example of address management in the shared buffer switch according to the present invention.

Although four address chains are assigned to each of the two output lines in FIG. 9, four address chains may be assigned to each priority class if the switch supports priority control as is mentioned in FIG. 10. Cells are sorted to one of the address chain groups 53H-1, 53L-1, 53H-2, or 53L-2 (53H: high priority queue, 53L: low priority queue) corresponding to the priority class of each output. Cells are sorted based on the destination information (#1 or #2) and the priority indication (H: high priority, L: low priority) in the cell header. After that, just like the procedure explained with reference to FIG. 9, cells are distributed cyclically to each of the four address chains according to the distributive pointer 22 of each address chain group. When reading cells from address chain groups, both read pointer 32 and selector 250 for each address chain group are driven by the read controller 251 so as to keep the order in which the cells were stored in each chain. In FIG. 10, priority control is performed in such a way that high priority cells are output with a precedence and low priority cells are output only when there is no high priority cell. Depending on the configuration of the read controller, another type of control, such as fixed bandwidth allocation, is also possible. In addition, the pipeline processing of shared buffer addresses accordance with in the present invention can also apply not only to each priority class, but also to various flows such as connection level, packet level of the upper layer, etc.

<Second Embodiment>

Figure 11:
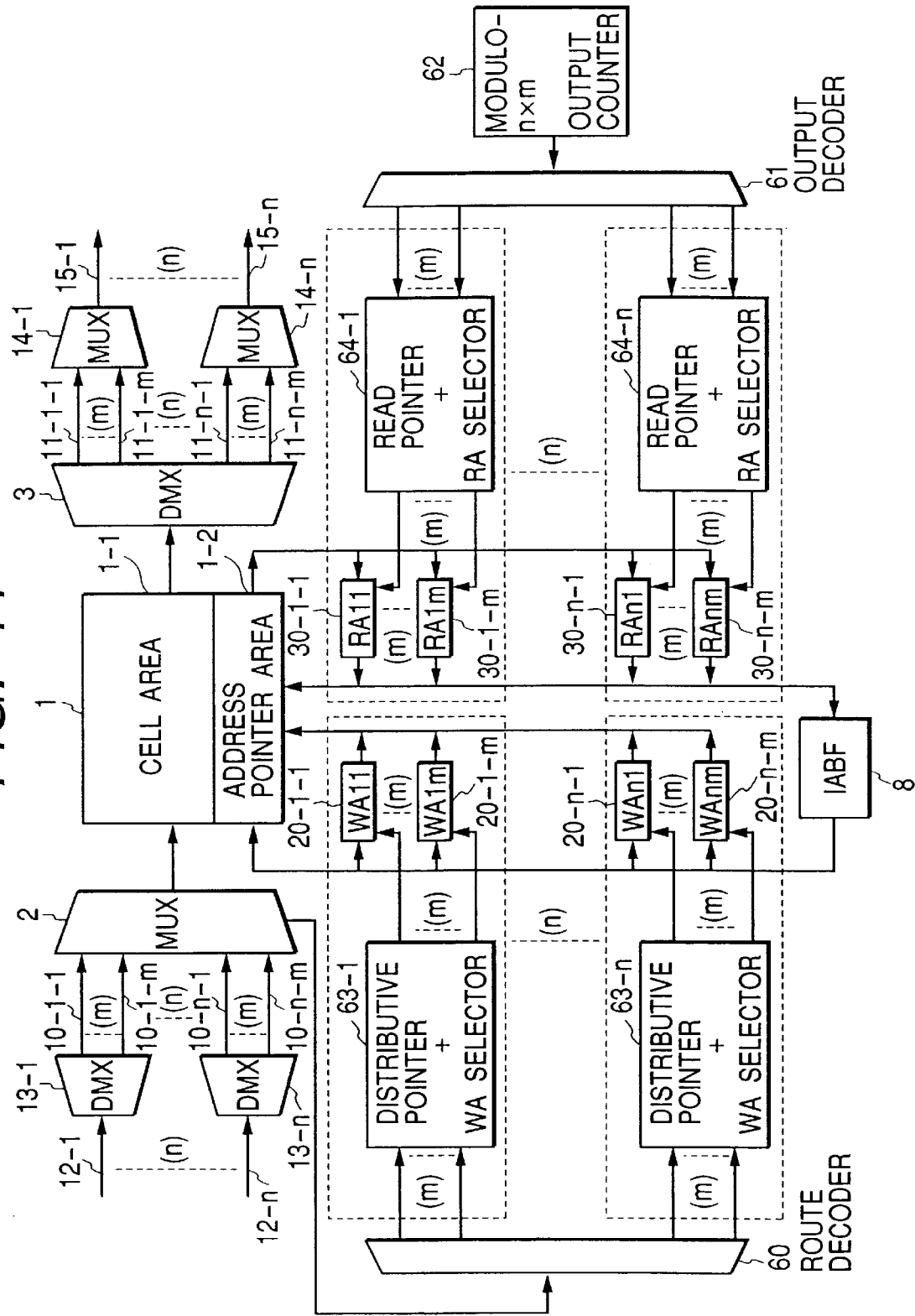
FIG. 11 is a block diagram of the shared buffer switch according to the present invention.

FIG. 11 is a block diagram of a n×n shared buffer switch with input/output line speed of mV This switch is realized by a mn×mn shared buffer switch with an input/output line speed of V, m demultiplexers (DMX) connected to the input lines of the above-mentioned mn×mn switch, and m multiplexers (MUX) connected the output lines of the above-mentioned mn×mn switch. The switch is provided with a buffer memory 1; a multiplexer (MUX) 2; a demultiplexer (DMUX) 3; an idle address buffer (IABF) 8; input lines 10 (10-1-1 to 10-n-m); output lines 11 (11-1-1 to 11-n-m); fast input lines 12 (12-1 to 12-n); fast output lines 15 (15-1 to 15-n); demultiplexers(DMX) 13 (13-1 to 13-n); multiplexers (MUX) 14 (14-1 to 14-n); write address registers (WA) 20; read address registers (RA) 30; a route decoder 60; an output decoder 61; an output counter 62; distributive pointer+WA selector assemblies 63; and read pointer+RA selector 64 assemblies. The buffer memory 1 is divided into a cell area 1-1 and an address pointer area 1-2.

First, the operation of the shared buffer switch in the low speed line mode is described. In this mode, the switch is connected to none of the demultiplexers 13 (13-1 to 13-n) and multiplexers 14 (14-1 to 14-n). In addition, all of the read pointer+RA selector assembly 63 and the read pointer+RA selector assembly 64 are invalidated. That is, the configuration of this switch is the same as that of the switch shown in FIG. 2 except that the switching capacity is mn×mn.

Next, the operation of the switch in the fast line mode will be described. In this mode, the demultiplexers(DMX) 13 (13-1 to 13-n) and multiplexers 14 (14-1 to 14-n)are connected to the switch. In addition, all of the read pointer+RA selector assembly 63 and the read pointer+RA elector assembly 64 are validated. First, cells from the input line 12 is demultiplexed to m slow input lines by the DMX 13, and then entered to the MUX 2. Next, the route decoder 60 decodes a destination output line according to the cell header from the MUX 2. Then, a distributive pointer+WA selector assembly selects one of the m write address registers 20 (20-x-1 to 20-x-m(x: any of 1 to n)) corresponding to the decoded output line cyclically. The detailed operation of the distributive pointer+WA selector assembly 63 is as described above with reference to FIG. 5.

Next, a description will be provided to show how cells are read from the switch. When a cell is read from the buffer memory 1, the reading address is specified by selecting one of the m read address registers (RA) 30 (30-x-1 to 30-x-m(x: any of 1 to n)) provided for each output line 15. In this embodiment, the output counter is assumed to be a modulo-nxm counters. In this case, the read pointer+RA selector assembly 64 selects the read address register 30 for each line 15 so as to maintain cell sequence integrity, that is, so as to select one of the read address registers 30 cyclically in the same order of the corresponding write address registers 20. The detailed operation of the read pointer+RA selector assembly 64 is the same as that described with reference to FIG. 6.

Cells from the buffer memory 1 are demultiplexed to the output line 11 through the demultiplexer 3. After that, cells are multiplexed to fast output lines 15 so as to maintain the sequential order through the MUX 14. With the operation principle described above, the shared buffer switch with fast input/output lines is realized by addition of small circuits and minor modification of the base switch.

Furthermore, slow lines and fast lines can coexist in the same switch by connecting the DMX 13 and the MUX 14 to specific slow lines and validating the corresponding distributive pointer+WA selector assembly 63 and read pointer+RA selector assembly 64.

<Third Embodiment>

Figure 12:
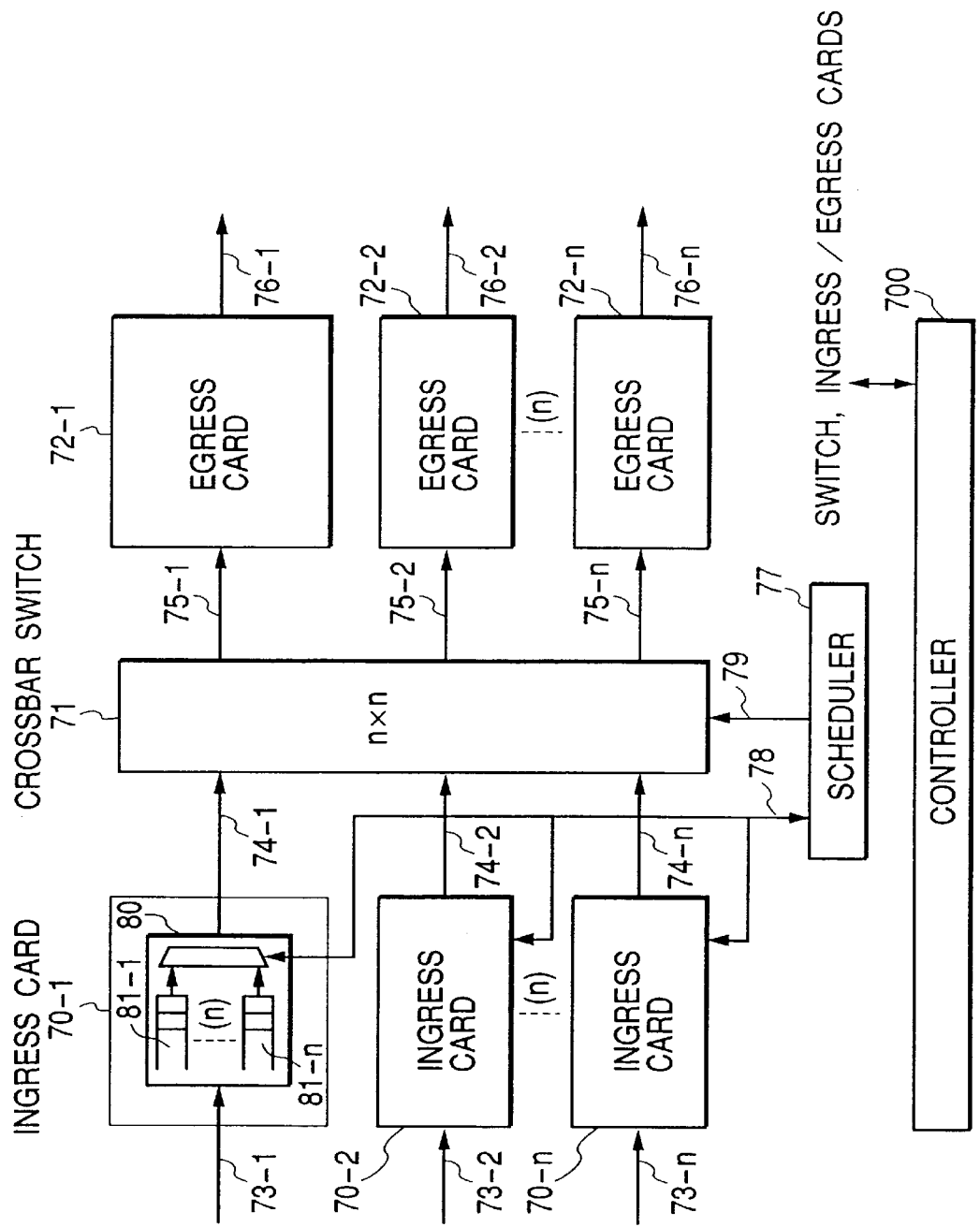
FIG. 12 is a block diagram of a gigabit router according to the present invention.

Another example of the shared buffer switch according to the present invention will be explained as follows. FIG.12 shows an input buffer+crossbar switch assembly employed for a gigabit router, etc. The shared buffer switch according to the present invention can be applied to the input buffer part.

First, the components of a gigabit router will be explained. An ingress card 70 functions as a physical layer termination, a packet segmentation to cells/packet reassembly from cells determination of the forwarding port, and cell buffering, etc. cells are buffered into queues allotted to each switch port 81 (81-1 to 81-n) (to be referred to as virtual output queues hereafter). Each virtual output queue(81-1 to 81-n) corresponds to respective egress cards 72 (72-1 to 72-n). The input buffer 80 sends a transmission request to the scheduler 77 via line 78 before transmitting cells. The scheduler 77 then selects one ingress card 70 that has issued the transmission request for each egress card 72. The scheduler 77 notifies admission to the virtual output queue of the ingress card 70 via the line 78. The scheduler 77 also changes the configuration of the crossbar switch via the line 79, so as to physically connect the selected ingress card 70 to the designated egress card. After the cells are switched by the crossbar 71, an egress card 72 assembles cells into original packets filters packets, gives priority controls, and executes physical layer processings, such as conversion of an electrical level to a light level, etc.

Figure 13:
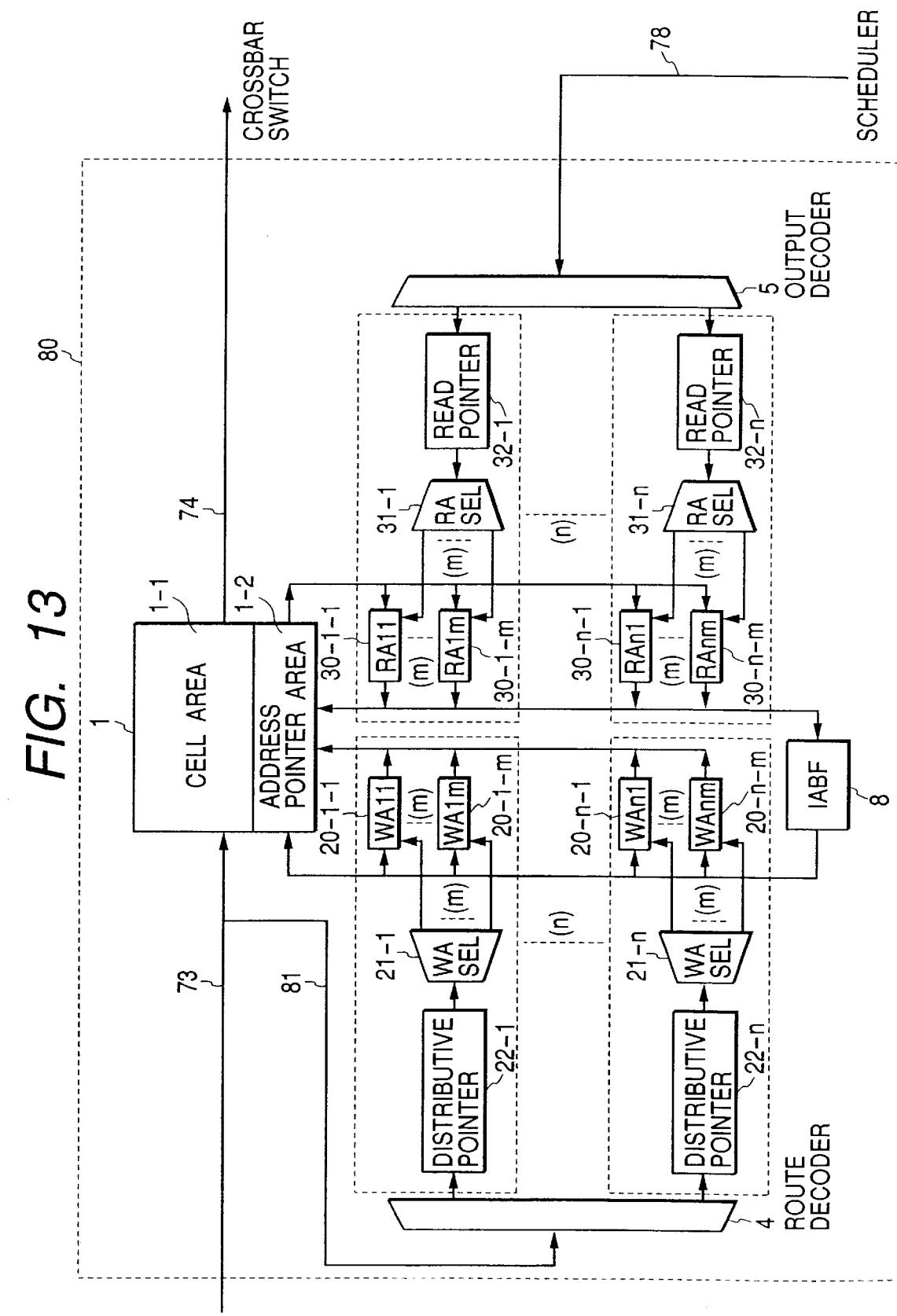
FIG. 13 is a block diagram of the input buffer of the gigabit router according to the present invention.
Figure 14:
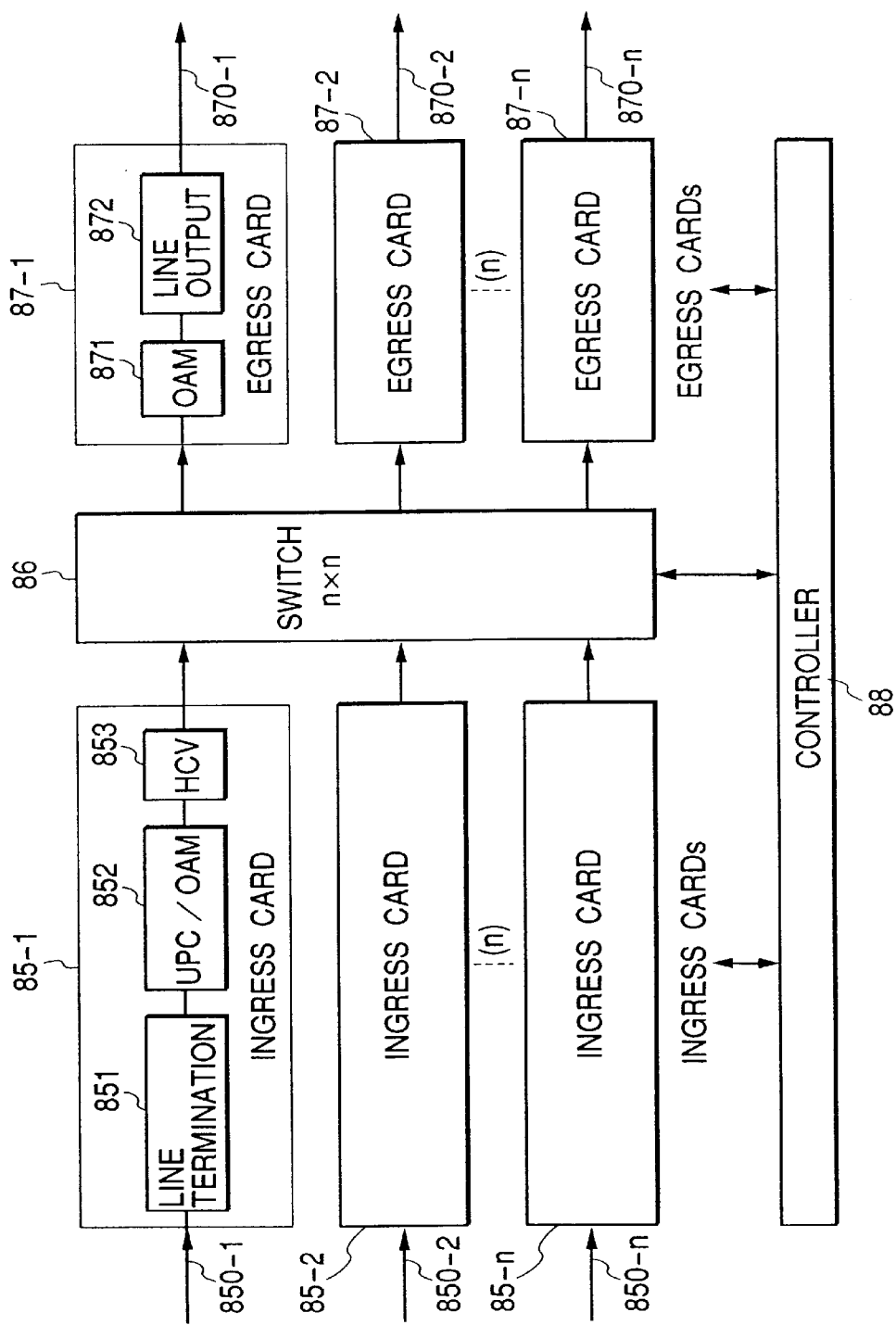
FIG. 14 is a block diagram of a conventional ATM switching apparatus.

FIG. 13 is a detailed block diagram of the input buffer 80 provided in the ingress card 70 of the present invention. The input buffer is provided with a buffer memory 1; a route decoder 4; an output decoder 5; an idle address buffer 8; an input line 73; an output link 74 to the crossbar switch 71; write address registers (RA) 20; RA selectors 21; distributive pointers 22; read address registers (RA) 30; RA selectors 31; read pointers 32; and an output directing line 78 from the scheduler 77. The buffer memory 1 is divided into a cell area 1-1 and an address pointer area 1-2.

The destination information is taken out from each cell received from the input line 73 and is then decoded at the route decoder 4. In the cell buffer 1, a plurality of address chains are formed corresponding to each of the virtual output queues 81 (81-1 to 81-n). The writing process of cells into those address chains is just like that of the shared buffer switch shown in FIG. 1. In the reading process of those address chains, a readable queue is directed from the scheduler 77 via the output directing line 78, not from the cyclic counter. This is the only difference from the shared buffer switch shown in FIGS. 1 and 11. Except for this point, treading addresses management in this embodiment is the same as that of the shared buffer switch explained with reference to FIGS. 1 and 11. Although address chains are formed for each virtual output queue in this embodiment, it is also possible to form an address chain for each flow level, for example, for each priority level as shown in FIG. 10. With such a configuration of the switch with a shared buffer, it is possible to compose an input buffer with a fast connection link 74 with use of a shared buffer.

The present invention, therefore, can provide the shared buffer switch with fast input and output lines.

Although the present invention has been described in connection with the above preferred embodiments thereof, many other variations and modifications will now become apparent to those skilled in the art.

What is claimed is:

1. A packet switching system for switching plurality of packets inputted from a plurality of input lines to any of a plurality of output lines according to the destination information included in the packet header of each of those packets, comprising:

a first memory including a first area for storing a plurality of packets inputted from the input lines and a second area for specifying an address of the first area;

a plurality of write address register groups made to correspond one for one with the output lines, the write address register groups electrically connected to the first memory, each of the write address register groups having a plurality of write address registers that hold write addresses for writing packets in the first memory respectively;

a plurality of write address selectors made to correspond one for one with the write address register groups, each write address selector is electrically connected to a corresponding one of the write address register groups respectively;

a plurality of read address register groups made to correspond one for one with the write address registers groups, the read address register groups electrically connected to the first memory, each of the read address register groups having the same number of read address registers as the write address registers of a corresponding write address register group, each of the read address registers holds a read address for reading out packets from the first memory;

a plurality of read address selectors made to correspond one for one with the read address register groups, each read address selector is electrically connected to a corresponding one of the read address register groups respectively; and a second memory electrically connected to the first memory, the write address register groups and the read address register groups, for holding idle addresses of the first memory, outputting the idle addresses to the first memory and the write address groups, and receiving read addresses where packets have been read out from the first memory as idle addresses from the read address registers, wherein each of the write address selectors selects the write address registers sequentially and the selected write address registers output write addresses to the first memory, and wherein each of the read address selectors selects the read address registers sequentially and the selected read address registers output read addresses to the first memory.

2. A packet switching system according to claim 1, wherein the read address registers of any of the read address register groups are made to correspond one for one with the write address registers of the corresponding write address register group, wherein each of the write address selectors cyclically selects write address registers and each of the read address selectors cyclically selects read address registers, and wherein the order that read address registers are selected is the same order as the corresponding write address registers are selected.

3. A packet switching system according to claim 1, wherein the write address register groups are made to correspond one for one with the output lines and priority classes of packets.

4. A packet switching system according to claim 1, wherein the write address selectors comprise means for selecting whether or not to select the write address registers cyclically and the read address selectors comprise means for selecting whether or not to select the read address registers cyclically.

5. A packet switching system according to claim 2, further comprising:

a plurality of distributive pointers electrically connected to the write address selectors for controlling the write address selectors such that the write address selectors select write address registers cyclically respectively, and a plurality of read pointers electrically connected to the read address selectors for controlling the read address selectors such that the read address selectors select read address registers cyclically, respectively.

6. A packet switching system according to claim 5, wherein each of the write address register groups has m write address registers (m is natural number greater than or equal to 2) and each of the read address register groups has m read address registers (m is natural number greater than equal to 2); wherein each of the distributive pointers has a first modulo-m counter and selects write address registers cyclically by counting up the value of the first modulo-m counter and each of the read pointers has a second modulo-m counter and selects read address registers cyclically by counting up the value of the second modulo-m counter.

7. A packet switching system comprising:

n demultiplexers (n is natural number greater than or equal to 2), each demultiplexer demultiplexes an input line to m input lines (m is natural number greater than or equal to 2);

n multiplexers each of which multiplexes m output lines to an output line;

a first memory including a first area for storing a plurality of packets and a second area for specifying an address of the first area;

n write address register groups, each of the write address register groups having m write address registers that hold write addresses, wherein mn write address registers are made to correspond one for one with mn output lines, and wherein each of the write address register groups are connected to the first memory electrically for writing packets in the first memory respectively;

n write address selectors made to correspond one for one with the n write address register groups, each write address selector is electrically connected to a corresponding one of the n write address register groups respectively;

n read address register groups being made to correspond one for one with the n write address register groups and being connected the first memory, each of the read address register groups having the same number of read address registers as the write address registers of the corresponding write address register group, each of the read address registers holding a read address for reading out packets from the first memory;

n read address selectors made to correspond one for one with the n read address register groups, the read address selectors electrically connected to one of the n read address register groups respectively; and a second memory electrically connected to the first memory, the n write address register groups and the n read address register groups, for holding idle addresses of the first memory, outputting the idle addresses to the first memory and any of the write address registers of the n write address register groups, and receiving read addresses where packets have been read out from the first memory as idle addresses from the read address registers of the n read address register groups, wherein each of the n write address selectors selects the write address registers sequentially and the selected write address registers output write addresses to the first memory so as to buffer the packets bound for the output lines corresponding to the write address register groups; and wherein each of the n read address selectors selects the read address registers sequentially and the selected read address registers output read addresses of the packets bound for the output lines corresponding to the write address register groups to the first memory.

8. A packet switching system according to claim 7, wherein the m read address registers included in each of the n read address register groups are made to correspond one for one with the m write address registers of the n corresponding write address register group, wherein each of the n write address selectors cyclically selects write address registers electrically connected to said n write address selectors and each of the n read address selectors cyclically selects read address registers electrically connected to n read address selectors, wherein the order that read address registers are selected is the same order as the corresponding write address registers are selected.

9. An apparatus for controlling packet transmitting, comprising:

a first memory including a first area for storing a plurality of packets and a second area for specifying an address of the first area;

a plurality of write address register groups made to correspond one for one with output lines, the write address register groups electrically connected to the first memory, each of the write address register groups having a plurality of write address registers that hold a write address for writing packets in the first memory respectively;

a plurality of write address selectors electrically connected to corresponding write address register groups respectively, each of the write address selectors selects the write address registers for providing the write address for the first memory;

a plurality of read address register groups made to correspond one for one with output lines, the read address register groups electrically connected to the first memory, each of the read address register groups having a plurality of read address registers that hold a read address for reading out packets from the first memory respectively;

a plurality of read address selectors electrically connected to corresponding read address register groups respectively, each of the read address selectors selects the read address registers for providing the read address for the first memory; and a second memory electrically connected to the first memory, the write address register groups and the read address register groups, for holding idle addresses of the first memory, outputting the idle addresses to the first memory and the write address registers of the write address register groups which output the write address to the first memory, and receiving read addresses as idle addresses from the read address registers of the read address register groups which gave the read address to the first memory, wherein the first memory outputs new read addresses to read address registers which have given read addresses to the first memory, the new read addresses being stored in the second area and specified by the read addresses which the read address registers have given, and outputs packets sequentially according to read addresses which is given sequentially from the read address registers of each read address register group, and wherein a time interval which the first area outputs a packet to a specific one of the output line is shorter than a time interval which the second area outputs a read address to a specific one of the read address registers of one of the corresponding read address register group to the specific output line.

* * * * *